(12) United States Patent
Ishida

(10) Patent No.: US 12,444,965 B2
(45) Date of Patent: Oct. 14, 2025

(54) POWER SUPPLY SYSTEM USING A THREE-INPUT AMPLIFIER TO CONTROL CHARGINGS OF A BATTERY AND AN OPERATION OF A REGULATOR

(71) Applicant: WILL SEMICONDUCTOR (SHANGHAI) CO. LTD., Shanghai (CN)

(72) Inventor: Manabu Ishida, Miyagi (JP)

(73) Assignee: WILL SEMICONDUCTOR (SHANGHAI) CO. LTD., Shanghai (CN)

( * ) Notice: Subject to any disclaimer, the term of this patent is extended or adjusted under 35 U.S.C. 154(b) by 576 days.

(21) Appl. No.: 17/873,951

(22) Filed: Jul. 26, 2022

(65) Prior Publication Data
US 2023/0411984 A1    Dec. 21, 2023

(30) Foreign Application Priority Data
Jun. 17, 2022    (CN) .......................... 202210691586.5

(51) Int. Cl.
*H02J 7/00*    (2006.01)
(52) U.S. Cl.
CPC ....... *H02J 7/00712* (2020.01); *H02J 2207/20* (2020.01)
(58) Field of Classification Search
CPC ............. H02J 7/00712; H02J 7/00714; H02J 7/007182; H02J 2207/20; Y02E 60/10
USPC ........................................................ 320/164
See application file for complete search history.

(56) References Cited

U.S. PATENT DOCUMENTS

| | | | | |
|---|---|---|---|---|
| 4,420,788 A | * | 12/1983 | Wilkinson | H02H 3/382 361/85 |
| 4,520,323 A | * | 5/1985 | Nakayama | H03F 1/307 330/268 |
| 4,540,949 A | * | 9/1985 | Haque | H03F 3/45753 330/85 |
| 5,010,282 A | * | 4/1991 | Moberg | H02P 6/08 318/696 |
| 5,041,795 A | * | 8/1991 | Bowers | H03F 3/45071 330/84 |
| 5,089,768 A | * | 2/1992 | Sato | G05F 1/648 323/318 |

(Continued)

*Primary Examiner* — Drew A Dunn
*Assistant Examiner* — Frank Alexis Silva
(74) *Attorney, Agent, or Firm* — MUNCY, GEISSLER, OLDS & LOWE, P.C.

(57) ABSTRACT

A power supply system includes a regulator, outputting a system voltage; a load, receiving the system voltage to operate; a battery, charged by the system voltage; a charging transistor, receiving the system voltage and controlling a charging current to the battery; and a three-input amplifier, in which three factors including a charging current detection value, a reference charging current, and a reference limit current determined according to a difference between the system voltage and a minimum system voltage are input, and which obtains an output corresponding to a difference between the reference charging current and the charging current detection value when the reference charging current is equal to or less than the reference limit current, and obtains an output corresponding to a difference between the reference limit current and the charging current detection value when the reference charging current exceeds the reference limit current.

2 Claims, 5 Drawing Sheets

(56) References Cited

U.S. PATENT DOCUMENTS

| | | | | |
|---|---|---|---|---|
| 5,850,137 A * | 12/1998 | Takimoto | H02J 7/00 | 320/140 |
| 5,963,156 A * | 10/1999 | Lewicki | H03F 3/45986 | 341/122 |
| 6,049,201 A * | 4/2000 | Feldtkeller | H02M 3/07 | 323/284 |
| 6,091,234 A * | 7/2000 | Kitagawa | H02M 3/1588 | 323/244 |
| 6,366,475 B2 * | 4/2002 | Nakazawa | H02M 3/33523 | 363/21.01 |
| 6,369,561 B1 * | 4/2002 | Pappalardo | H02J 7/00 | 323/284 |
| 6,445,167 B1 * | 9/2002 | Marty | G05F 1/468 | 323/280 |
| 6,452,364 B1 * | 9/2002 | Saeki | H02J 7/02 | 320/137 |
| 6,583,607 B1 * | 6/2003 | Marty | G05F 1/563 | 323/275 |
| 6,586,917 B1 * | 7/2003 | Smith | G05F 1/565 | 323/280 |
| 6,803,794 B2 * | 10/2004 | Martin | G11C 7/067 | 327/54 |
| 6,859,022 B2 * | 2/2005 | Oglesbee | G05F 1/565 | 323/285 |
| 6,977,488 B1 * | 12/2005 | Nogawa | H02M 3/1582 | 323/299 |
| 7,003,421 B1 * | 2/2006 | Allen, III | G01R 19/16552 | 702/117 |
| 7,362,595 B2 * | 4/2008 | Noma | H02M 3/1588 | 323/224 |
| 7,453,287 B2 * | 11/2008 | Umeki | H02M 3/1588 | 326/82 |
| 7,459,886 B1 * | 12/2008 | Potanin | H02J 7/0068 | 320/135 |
| 7,573,252 B1 * | 8/2009 | Griesert | G05F 3/262 | 323/901 |
| 7,710,079 B2 * | 5/2010 | Martin | H02J 7/0068 | 320/158 |
| 7,777,455 B1 * | 8/2010 | Martin | H02M 3/158 | 320/160 |
| 7,782,024 B2 * | 8/2010 | Fukushi | H02M 1/088 | 323/224 |
| 7,868,602 B2 * | 1/2011 | Omi | H02M 1/36 | 323/284 |
| 8,378,634 B2 * | 2/2013 | Kung | H02M 3/156 | 320/152 |
| 8,669,748 B2 * | 3/2014 | Ishii | H02M 3/1588 | 323/283 |
| 8,692,482 B2 * | 4/2014 | Szczeszynski | H05B 45/3725 | 315/307 |
| 8,742,730 B2 * | 6/2014 | Nakagawa | H01M 10/48 | 320/160 |
| 8,847,569 B2 * | 9/2014 | Terada | G05F 1/575 | 323/284 |
| 8,854,023 B2 * | 10/2014 | Ock | G05F 1/56 | 323/280 |
| 8,917,062 B2 * | 12/2014 | Lu | H02J 7/007182 | 320/135 |
| 9,054,596 B2 * | 6/2015 | Ishii | H02M 3/1588 | |
| 9,112,409 B2 * | 8/2015 | Li | H02M 3/158 | |
| 9,112,413 B2 * | 8/2015 | Barth | H02M 5/293 | |
| 9,142,982 B2 * | 9/2015 | Chen | H02J 7/0048 | |
| 9,153,987 B2 * | 10/2015 | Mok | H02J 7/00 | |
| 9,166,429 B2 * | 10/2015 | Wong | H02J 7/00 | |
| 9,276,475 B2 * | 3/2016 | Barth | H02M 5/293 | |
| 9,293,997 B2 * | 3/2016 | Ma | H02M 3/33523 | |
| 9,337,727 B2 * | 5/2016 | Szczeszynski | H02M 3/156 | |
| 9,407,221 B2 * | 8/2016 | Itakura | H03F 3/45183 | |
| 9,473,023 B2 * | 10/2016 | Vannorsdel | H03F 1/0227 | |
| 9,559,542 B2 * | 1/2017 | Deng | H02M 3/158 | |
| 9,933,799 B2 * | 4/2018 | Yang | G05F 1/575 | |
| 9,984,624 B2 * | 5/2018 | Takahashi | G06F 3/04164 | |
| 10,110,032 B2 * | 10/2018 | Kong | H02J 50/40 | |
| 10,148,107 B2 * | 12/2018 | Wong | H02J 7/00 | |
| 10,291,060 B2 * | 5/2019 | Tian | H02M 3/33507 | |
| 10,348,101 B2 * | 7/2019 | Li | H02J 7/00714 | |
| 10,566,828 B2 * | 2/2020 | Tian | H02M 1/44 | |
| 10,714,004 B2 * | 7/2020 | Takahashi | G09G 3/3233 | |
| 10,714,945 B2 * | 7/2020 | Kong | H02J 7/342 | |
| 10,714,947 B2 | 7/2020 | Li | | |
| 10,734,901 B2 * | 8/2020 | Oh | H02M 3/1588 | |
| 10,910,866 B2 * | 2/2021 | Zhang | H02J 7/00712 | |
| 11,183,977 B2 * | 11/2021 | Mei | H03F 3/04 | |
| 11,296,532 B2 * | 4/2022 | Jiang | H02J 7/04 | |
| 11,303,137 B2 * | 4/2022 | Li | H02J 7/04 | |
| 11,509,157 B2 * | 11/2022 | Cho | H02J 7/00032 | |
| 11,722,105 B2 * | 8/2023 | Mei | H02M 1/36 | 330/293 |
| 12,021,402 B2 * | 6/2024 | Liu | H02J 7/0016 | |
| 2002/0015316 A1 * | 2/2002 | Nakazawa | H02M 3/33523 | 363/20 |
| 2002/0017897 A1 * | 2/2002 | Wilcox | H02M 3/1588 | 323/282 |
| 2003/0067283 A1 * | 4/2003 | Takimoto | H02J 7/06 | 320/162 |
| 2003/0147193 A1 * | 8/2003 | Hamon | G05F 1/573 | 323/280 |
| 2003/0155900 A1 * | 8/2003 | Oglesbee | H02M 3/157 | 323/284 |
| 2003/0218454 A1 * | 11/2003 | Cunnac | G05F 1/575 | 323/316 |
| 2004/0004467 A1 * | 1/2004 | Miyanaga | G05F 1/573 | 323/277 |
| 2004/0095095 A1 * | 5/2004 | Yamamoto | H02J 7/007182 | 320/128 |
| 2004/0164771 A1 * | 8/2004 | Martin | G11C 11/22 | 327/52 |
| 2005/0275391 A1 * | 12/2005 | Ito | G05F 1/575 | 323/282 |
| 2006/0006857 A1 * | 1/2006 | Lenz | G05F 1/565 | 323/288 |
| 2006/0113978 A1 * | 6/2006 | Suzuki | G05F 1/573 | 323/282 |
| 2006/0220631 A1 * | 10/2006 | Ito | H03K 17/22 | 323/283 |
| 2006/0238178 A1 * | 10/2006 | Agari | H02M 3/156 | 323/268 |
| 2007/0029975 A1 * | 2/2007 | Martin | H02J 7/0068 | 320/134 |
| 2007/0057658 A1 * | 3/2007 | Hasegawa | H02M 3/1588 | 323/282 |
| 2007/0182396 A1 * | 8/2007 | Inatomi | H02M 3/1563 | 323/283 |
| 2007/0195565 A1 * | 8/2007 | Noma | H02M 3/1588 | 363/49 |
| 2007/0216378 A1 * | 9/2007 | Ozawa | H02J 7/0068 | 323/252 |
| 2007/0229036 A1 * | 10/2007 | Ozawa | H02J 7/0031 | 320/134 |
| 2007/0257639 A1 * | 11/2007 | D'Arrigo | H02J 7/007192 | 320/128 |
| 2007/0296386 A1 * | 12/2007 | Umeki | H02M 1/36 | 323/284 |
| 2008/0100274 A1 * | 5/2008 | Hayakawa | H02M 1/36 | 323/284 |
| 2008/0197821 A1 * | 8/2008 | Hasegawa | H02M 1/36 | 323/238 |
| 2008/0258698 A1 * | 10/2008 | Kitagawa | H02M 1/36 | 323/284 |
| 2009/0027011 A1 * | 1/2009 | Umetsu | H02J 7/0044 | 320/145 |
| 2009/0027012 A1 * | 1/2009 | Umetsu | H02J 7/0044 | 320/148 |
| 2009/0039853 A1 * | 2/2009 | Omi | H02M 3/156 | 323/284 |
| 2009/0072626 A1 * | 3/2009 | Watanabe | H02M 3/1588 | 307/85 |

(56) References Cited

U.S. PATENT DOCUMENTS

| | | | | |
|---|---|---|---|---|
| 2009/0167200 | A1* | 7/2009 | Brokaw | H05B 45/14 327/581 |
| 2009/0184716 | A1* | 7/2009 | Yonezawa | G01R 19/16542 324/429 |
| 2009/0195230 | A1* | 8/2009 | Adkins | H02M 3/156 323/282 |
| 2009/0237047 | A1* | 9/2009 | Matsugaki | H02M 3/156 323/282 |
| 2009/0261797 | A1* | 10/2009 | Shibata | H02M 1/36 323/288 |
| 2009/0284237 | A1* | 11/2009 | Kitagawa | H02M 3/156 323/282 |
| 2009/0295339 | A1* | 12/2009 | Wong | H02J 7/00 320/162 |
| 2009/0295340 | A1* | 12/2009 | Kwon | G05F 1/565 323/220 |
| 2010/0090647 | A1* | 4/2010 | Umetsu | H02J 7/007182 320/116 |
| 2010/0141218 | A1* | 6/2010 | Nakagawa | H02J 7/0071 320/162 |
| 2010/0237845 | A1* | 9/2010 | Scaldaferri | H02M 3/158 323/299 |
| 2010/0277227 | A1* | 11/2010 | Shiwaya | H02M 3/07 327/536 |
| 2010/0320973 | A1* | 12/2010 | Nishida | H02J 7/007182 320/145 |
| 2010/0320980 | A1* | 12/2010 | Terada | G05F 1/575 323/282 |
| 2011/0057625 | A1* | 3/2011 | Ashida | H02J 7/00714 320/162 |
| 2011/0133700 | A1* | 6/2011 | Martin | H02J 7/0068 320/145 |
| 2011/0227542 | A1* | 9/2011 | Akaho | H02J 7/00714 320/145 |
| 2012/0049959 | A1* | 3/2012 | Wang | H03F 1/30 330/69 |
| 2012/0098513 | A1* | 4/2012 | Terada | G05F 1/5735 323/284 |
| 2012/0126778 | A1* | 5/2012 | Chevalier | H02M 3/07 323/311 |
| 2012/0146541 | A1* | 6/2012 | Szczeszynski | H05B 45/44 315/294 |
| 2012/0235623 | A1* | 9/2012 | Ishino | H01M 10/44 320/101 |
| 2013/0033244 | A1* | 2/2013 | Ock | G05F 1/56 323/280 |
| 2013/0043828 | A1* | 2/2013 | Gurlahosur | H02J 7/007184 320/107 |
| 2013/0234677 | A1* | 9/2013 | Mok | H02J 7/0068 320/164 |
| 2013/0335047 | A1* | 12/2013 | Yamaguchi | H02M 3/156 323/282 |
| 2014/0042999 | A1* | 2/2014 | Barth | H02M 5/293 323/271 |
| 2014/0049994 | A1* | 2/2014 | Ishii | H02M 1/36 363/49 |
| 2014/0062435 | A1* | 3/2014 | Lu | H02J 7/007182 323/282 |
| 2014/0070780 | A1* | 3/2014 | Yanagida | H02M 3/1588 323/271 |
| 2014/0125299 | A1* | 5/2014 | Barth | H02M 3/1584 323/266 |
| 2014/0176018 | A1* | 6/2014 | Szczeszynski | H05B 45/3725 323/284 |
| 2014/0184173 | A1* | 7/2014 | Szepesi | H02J 7/0068 320/164 |
| 2015/0130538 | A1* | 5/2015 | Itakura | H03F 3/45188 330/257 |
| 2015/0155783 | A1* | 6/2015 | Li | H03F 3/2173 323/271 |
| 2015/0188432 | A1* | 7/2015 | Vannorsdel | H02M 3/156 323/271 |
| 2015/0357849 | A1* | 12/2015 | Wong | H02J 7/00 320/137 |
| 2015/0357858 | A1* | 12/2015 | Deng | H02J 7/00711 320/107 |
| 2016/0087462 | A1* | 3/2016 | Kudo | H02J 7/00 320/162 |
| 2016/0154415 | A1* | 6/2016 | Biziitu | G05F 1/575 323/280 |
| 2017/0040818 | A1* | 2/2017 | Kong | H02J 7/342 |
| 2017/0126123 | A1* | 5/2017 | Hsiung | H02M 3/158 |
| 2017/0182894 | A1* | 6/2017 | Yamaguchi | H02M 3/1582 |
| 2017/0186371 | A1* | 6/2017 | Takahashi | G06F 3/0446 |
| 2018/0013303 | A1* | 1/2018 | Wu | H02J 7/02 |
| 2018/0090977 | A1* | 3/2018 | Zhang | H02J 7/00711 |
| 2018/0183262 | A1* | 6/2018 | Tian | H02J 7/00711 |
| 2018/0211595 | A1* | 7/2018 | Takahashi | G06F 3/04164 |
| 2018/0224876 | A1* | 8/2018 | Ogura | G05F 1/59 |
| 2018/0262023 | A1* | 9/2018 | Li | H02J 7/007182 |
| 2018/0331563 | A1* | 11/2018 | Tian | H02J 7/02 |
| 2018/0342890 | A1* | 11/2018 | Tian | H02M 7/04 |
| 2018/0351384 | A1* | 12/2018 | Koyama | H02J 7/0071 |
| 2019/0028016 | A1* | 1/2019 | Yang | H02M 1/08 |
| 2019/0058344 | A1* | 2/2019 | Kong | H02J 7/342 |
| 2019/0081489 | A1* | 3/2019 | Gerber | H02J 7/00308 |
| 2019/0252893 | A1* | 8/2019 | Gurlahosur | H02J 7/007182 |
| 2019/0280491 | A1* | 9/2019 | Li | H02J 7/0019 |
| 2019/0393766 | A1* | 12/2019 | Nagamatsu | H02M 1/15 |
| 2020/0076382 | A1* | 3/2020 | Mei | H03F 3/04 |
| 2020/0185949 | A1* | 6/2020 | Chang | H02J 7/007182 |
| 2020/0328601 | A1* | 10/2020 | Li | H01M 10/425 |
| 2021/0057929 | A1* | 2/2021 | Li | H02J 7/04 |
| 2021/0075244 | A1* | 3/2021 | Cho | H02J 7/02 |
| 2022/0029590 | A1* | 1/2022 | Mei | H03K 17/687 |
| 2022/0302732 | A1* | 9/2022 | Wen | H02M 1/007 |
| 2023/0029492 | A1* | 2/2023 | Zuo | B60L 53/24 |
| 2023/0047446 | A1* | 2/2023 | Liu | H02J 7/0016 |
| 2025/0031771 | A1* | 1/2025 | Bessant | H02J 7/00714 |

* cited by examiner

POWER SUPPLY SYSTEM USING A THREE-INPUT AMPLIFIER TO CONTROL CHARGINGS OF A BATTERY AND AN OPERATION OF A REGULATOR

BACKGROUND OF THE INVENTION

1. Field of the Invention

The disclosure relates to a power supply system that supplies a system voltage from a regulator to a load and a battery.

2. Description of the Related Art

In a battery-driven system that drives a plurality of loads by power from a battery, a predetermined system voltage is output from a regulator, and various system loads are driven by this system voltage. In addition, the battery is charged by the system voltage in some systems. In this case, it is designed to allow the battery to be charged while the system load is driven. Here, when the power consumption of the system load is large, the system voltage may decrease. As a countermeasure for this case, it is considered to reduce the charging current when the system voltage decreases.

Consequently, in order to control the charging current according to the system voltage, a control system that controls the charging current to a predetermined value normally and a control system that prevents the system voltage from being equal to or less than the predetermined value are required. And, a capacitor used for phase compensation is required in each control system.

SUMMARY OF THE INVENTION

A power supply system related to the disclosure includes:
a regulator, outputting a system voltage;
a load, receiving the system voltage to operate;
a battery, charged by the system voltage;
a charging transistor, receiving the system voltage and controlling a charging current to the battery; and
a three-input amplifier, in which three factors including a charging current detection value, a reference charging current, and a reference limit current determined according to a difference between the system voltage and a minimum system voltage are input, and which obtains an output corresponding to a difference between the reference charging current and the charging current detection value when the reference charging current is equal to or less than the reference limit current, and obtains an output corresponding to a difference between the reference limit current and the charging current detection value when the reference charging current exceeds the reference limit current, wherein
the current of the charging transistor is controlled by the output of the three-input amplifier.

According to the power supply system related to the disclosure, because the three-input amplifier is used, charging current control can be performed with a relatively simple configuration.

BRIEF DESCRIPTION OF THE DRAWINGS

FIG. 4 is a timing chart showing operations when a transistor NM1 is fully turned on.

PREFERRED EMBODIMENT OF THE PRESENT INVENTION

Hereinafter, embodiments of the disclosure are described with reference to the drawings. Note that, the following embodiments do not limit the scope of the disclosure, and configurations obtained by selectively combining multiple examples are also included in the disclosure.

Figure 1:
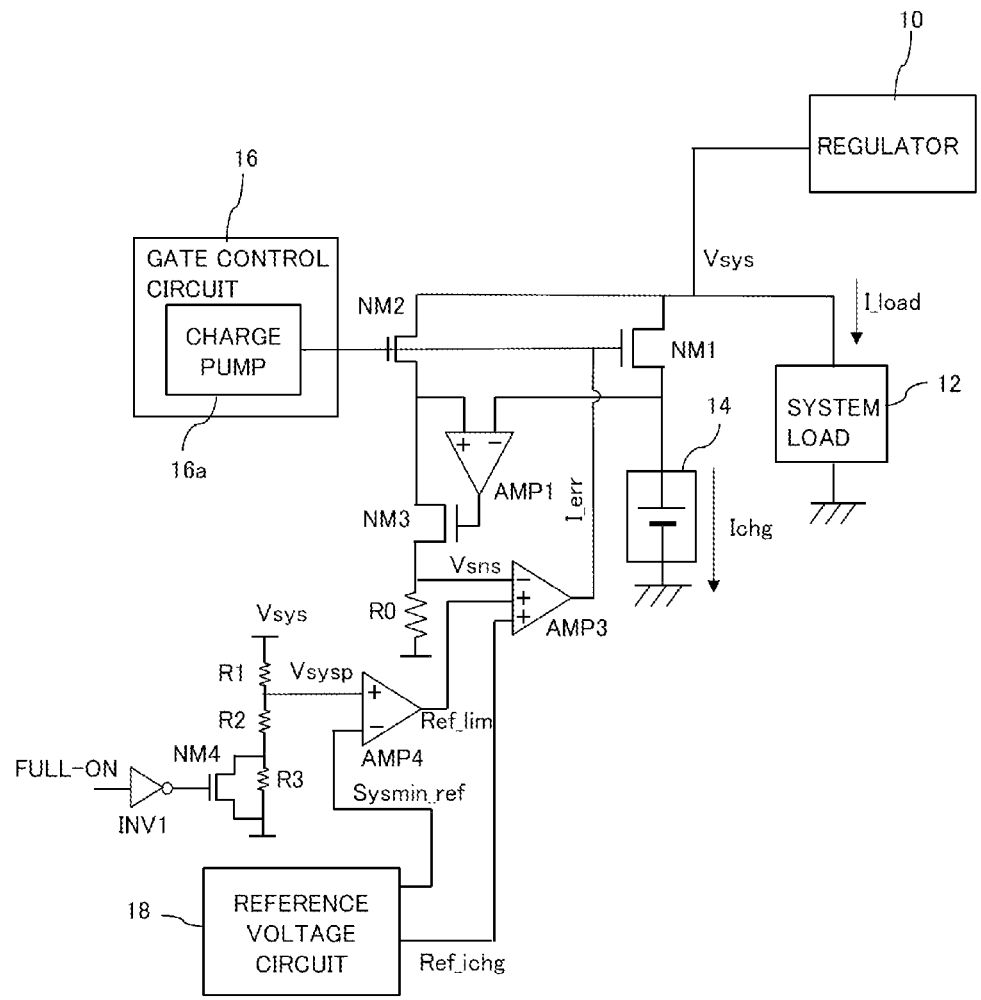
FIG. 1 is a diagram showing a configuration of a power supply system according to an embodiment of the present invention.

FIG. 1 is a diagram showing a configuration of a power supply system according to an embodiment of the present invention. A regulator 10 outputs a system voltage Vsys. The regulator 10 is composed of, for example, a DC-DC converter, and generates the system voltage Vsys from a main power source such as a DC power source, which is rectified from AC power, or another battery. For example, it can be assumed that the main power source is 5 V and the system voltage Vsys is about 3.65 V.

A system load 12 is connected to the regulator 10, and the system voltage Vsys is supplied to the system load 12. The system load 12 is an electronic device or an electrical device in various types, and is driven by the system voltage Vsys as the power source.

A transistor NM1, which is a charging transistor, is connected to the regulator 10, and the system voltage Vsys is supplied to a battery 14 via the transistor NM1. In this example, the transistor NM1 is composed of an n-channel metal-oxide-semiconductor field-effect transistor (MOSFET). The battery 14 is a secondary battery such as a lithium-ion battery, and is charged by the charging current from the transistor NM1.

In the transistor NM1, the drain is connected to the regulator 10, the source is connected to the battery 14, and the gate is connected to a gate control circuit 16. The gate control circuit 16 has a built-in charge pump 16a, can generate a voltage higher than a battery voltage Vbat, and supplies the gate drive voltage of the transistor NM1.

The drain of a transistor NM2 is also connected to the regulator 10, and the gate of the transistor NM2 is connected to the gate control circuit 16 together with the gate of the transistor NM1. In addition, the source of the transistor NM2 is connected to the ground via a transistor NM3 and a resistor R0.

And, an amplifier AMP1 is provided, in which a connection point of the transistor NM1 with the battery 14 is connected to the negative input end, and a connection point of the transistor NM2 with the transistor NM3 is connected to the positive input end. The output end of the amplifier AMP1 is connected to the gate of the transistor NM3.

Therefore, a current amount of the transistor NM3 is controlled, by the amplifier AMP1, so that the source voltages of the two transistors NM1 and NM2 are the same. Because the current from the transistor NM3 flows through the resistor R0, a signal Vsns corresponding to the current amount of the transistor NM1, that is, a detection value of the charging current (referred to as a charging current detection value) of the battery 14, is obtained on the upper side of the resistor R0.

Moreover, a reference voltage circuit 18 is provided, and the reference voltage circuit 18 generates and outputs a signal Ref_ichg for a reference charging current and a signal Sysmin_ref regarding a reference minimum system voltage for the system voltage Vsys.

Furthermore, three series-connected resistors R1, R2, and R3 for dividing the system voltage Vsys are provided, in which the system voltage Vsys is supplied to one end, and the other end is connected to the ground. A transistor NM4, which connects both ends of the lowest resistor R3, is connected in parallel to the resistor R3, and a full-on signal FULL-ON is supplied to the gate of the transistor NM4 via an inverter INV1. The full-on signal FULL-ON is a signal that becomes a H level when the transistor NM1 is fully turned on. Therefore, in a state that the transistor NM1 is not fully turned on, both ends of the resistor R3 are short-circuited, and a voltage Vsysp=Vsys*R2/(R1+R2) divided by the resistors R1 and R2 is obtained at a connection point between the resistors R1 and R2. In addition, when the transistor NM1 is fully turned on, a voltage (Vsys*(R2+R3)/(R1+R2+R3)), which is higher than the voltage when the transistor NM1 is turned off, is obtained at the connection point between the resistors R1 and R2.

An amplifier AMP4 which is an error amplifier is provided, in which the voltage Vsysp at the connection point between the resistors R1 and R2 is input to the positive input end and the signal Sysmin_ref for a reference minimum system voltage Sysmin is input to the negative input end. A signal Ref_lim is output from the amplifier AMP4. The signal Ref_lim is referred to as a reference limit current.

The signal Ref_lim is a signal corresponding to a difference between the voltage Vsysp obtained by dividing the system voltage Vsys and the signal Sysmin_ref indicating the reference minimum system voltage, and the signal Sysmin_ref corresponds to a minimum system voltage Vsysmin. Therefore, the value of the signal Ref_lim decreases with the decrease of the system voltage Vsys, and becomes 0 when the system voltage Vsys coincides with Vsysmin.

And, the signal Ref_lim is set to a value slightly higher than the signal Ref_ichg when the system voltage Vsys is a normal value.

The signal Ref_ichg, the signal Ref_lim, and the signal Vsns which is the detection value of the charging current are input to a three-input amplifier AMP3 which is an error amplifier. That is, the signal Vsns is input to the negative input end, and the signals Ref_ichg and Ref_lim are respectively input to the two positive input ends.

The three-input amplifier AMP3 selects the lower one of the input signals at the two positive input ends, and compares the selected signal with Vsns which is the signal at the negative input end.

The output end of the three-input amplifier AMP3 is connected to the gate of the transistor NM1. Therefore, the three-input amplifier AMP3 controls the gate of the transistor NM1 so that Vsns coincides with the lower one of the signals Ref_ichg and Ref_lim.

"Operation of Charging Current Control"

Figure 2:
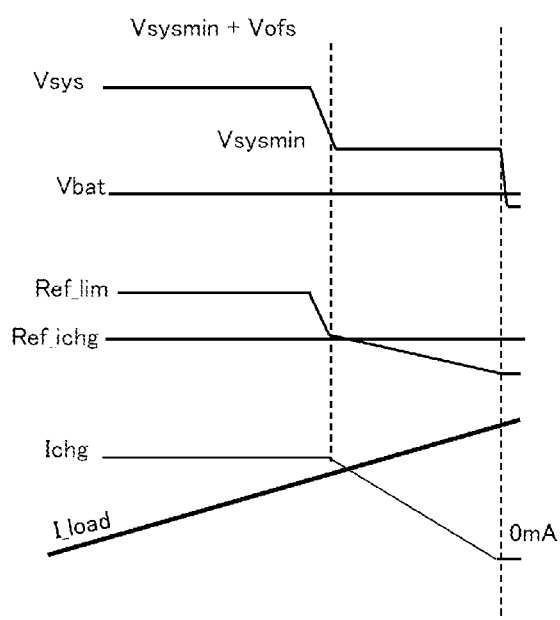
FIG. 2 is a timing chart showing operations of the power supply system shown in FIG. 1.

FIG. 2 is a timing chart showing operations of the power supply system shown in FIG. 1. First, in a normal state, the regulator 10 operates in a manner that the system voltage Vsys becomes Vsysmin+Vofs, which is the sum of the lower limit system voltage Vsysmin (for example, 3.5 V) and a set offset voltage Vofs (for example, 150 mV).

In this state, the signal Ref_lim is higher than the signal Ref_ichg, and thus the three-input amplifier AMP3 controls a charging current Ichg of the transistor NM1 in a manner that the signal Vsns becomes a value corresponding to the signal Ref_ichg. Therefore, the charging current Ichg becomes a predetermined value.

Here, in this example, a situation is assumed in which a current Iload in the system load 12 gradually increases. The regulator 10 intends to maintain Vsys at Vsysmin+Vofs, but when the current Iload gets higher, the system voltage Vsys cannot be maintained and starts to decrease.

When the system voltage Vsys decreases, the signal Vsysp starts to decrease in conjunction therewith, and the signal Ref_lim, which is the output of the amplifier AMP4, also starts to decrease. And, when the value of the signal Ref_lim is lower than the signal Ref_ichg, the three-input amplifier AMP3 compares Vsns with the signal Ref_lim to control the transistor NM1. Therefore, the charging current also decreases as the Vsys decreases.

Note that, in FIG. 2, it seems that Vsys remains constant after falling to Vsys_min, but this is a matter of scale, and actually Vsys is decreasing little by little. The signal Ref_lim, which is the output of the amplifier AMP4, is amplified by the amplifier AMP4, and thus gradually decreases as shown in FIG. 2.

In this way, according to the embodiment of the present invention, normally, the signal Ref_ichg is selected in the three-input amplifier AMP3 and is controlled to have an appropriate charging current corresponding thereto, and when the system voltage Vsys has decreased, the charging current can be reduced accordingly. Therefore, the configuration can be simplified.

"Configuration of Amplifier AMP4"

Figure 3:
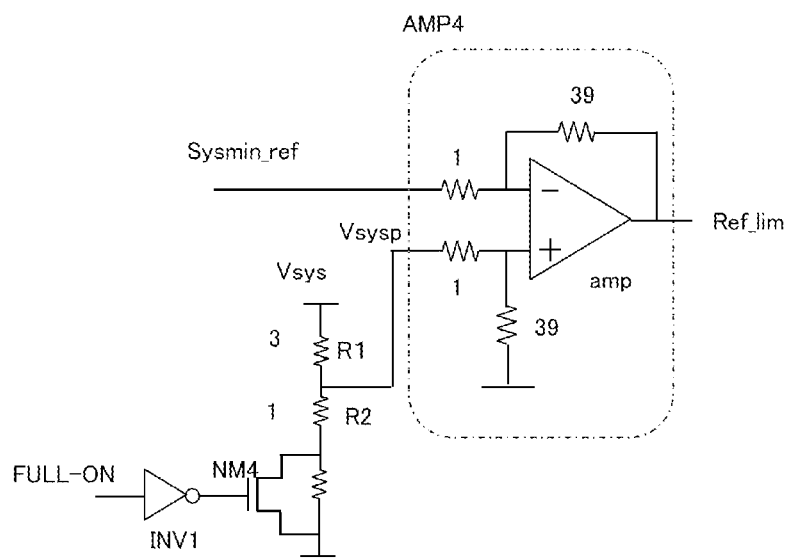
FIG. 3 is a diagram showing a configuration example of an amplifier AMP4.

FIG. 3 is a diagram showing a configuration example of the amplifier AMP4. The voltage Vsysp is input to the positive input end of the amplifier AMP4, and the resistance ratio of the resistors R1 and R2 is 3:1 in this example, and thus Vsysp=(1/4) Vsys. The signal Sysmin_ref is input to the negative input end, and Sysmin_ref=(1/4) Vsysmin is made in this example.

A resistance having a magnitude of "1" is disposed on a path from the positive input end of the amplifier AMP4 to the positive input end of an internal amplifier amp, and the positive input end of the internal amplifier amp is connected to the ground through a resistance having a magnitude of "39". Therefore, (39/40) Vsysp is applied to the positive input end of the internal amplifier amp. On the other hand, a resistance having a magnitude of "1" is disposed on a path from the negative input end of the amplifier AMP4 to the negative input end of the internal amplifier amp, and the output end of the internal amplifier amp is fed back to the negative input end of the internal amplifier amp through a resistance having a magnitude of "39".

Normally, as described above, Vsys=Vsysmin+Vofs is set, and Sysmin_ref=(1/4) Vsysmin is made. And, the internal resistance of the amplifier AMP4 is set to 1:39 as described above. Accordingly, the internal amplifier amp amplifies a difference between the positive and negative input ends by 40 times, and Ref_lim=10*Vofs is obtained at the output end. Therefore, by setting the 10*Vofs to a value greater than a maximum value of the signal Ref_ichg in advance, the signal Ref_ichg is selected as the input of the positive input end in the three-input amplifier AMP3. Moreover, by preparing the signal Ref_lim in advance, the signal Ref_lim functions as the current upper limit when an abnormality occurs in the signal Ref_ichg for some reason. In the above example, the amplification factor is set to 40 times. By setting the configuration of the amplifier having a relatively low gain in this way, a stable system can also be formed even if the AMP3 and the AMP4 are connected in cascade.

"Operation in Full-on State"

Figure 4:
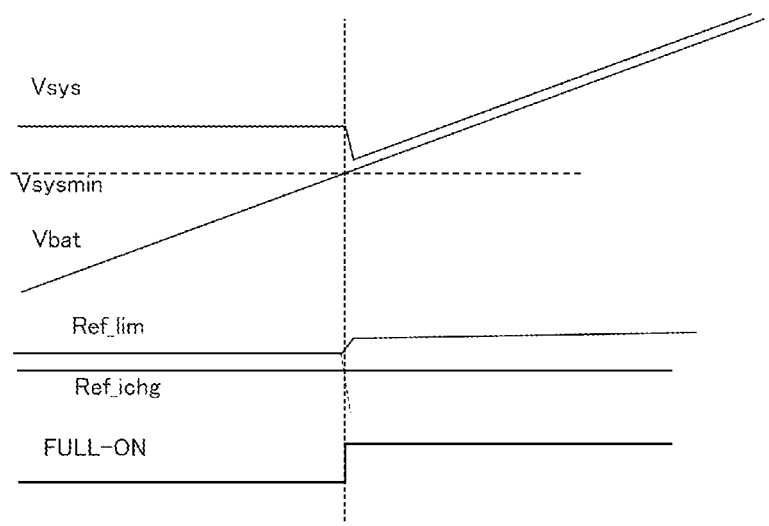

FIG. 4 is a timing chart showing operations when the transistor NM1 is fully turned on. In the first half of the state in which the battery voltage Vbat is lower than Vsysmin, the system operates with Vsys=Vsysmin+Vofs, Ref_lim is greater than the signal Ref_ichg, and the battery 14 is charged with the charging current Ichg based on the signal Ref_ichg.

Here, when the battery voltage Vbat reaches Vsysmin, the full-on signal FULL-ON is turned on. Accordingly, the circuit between the drain and the source is close to be short-circuited, and thus the system voltage Vsys decreases, and the signal Ref_lim is also about to fall. However, as described above, the transistor NM4 is turned off by turning on the full-on signal FULL-ON, and accordingly the signal Ref_lim is maintained at a high value and the charging current is prevented from decreasing. In addition, at a stage that the battery voltage Vbat has reached Vsysmin, that is, at a stage that the full-on signal FULL-ON has been turned on, the signal I_err is supplied to the regulator 10, the switching charging using the regulator 10 is started, and the battery voltage and the system voltage Vsys are increased.

"Regulator Control"

Figure 5:
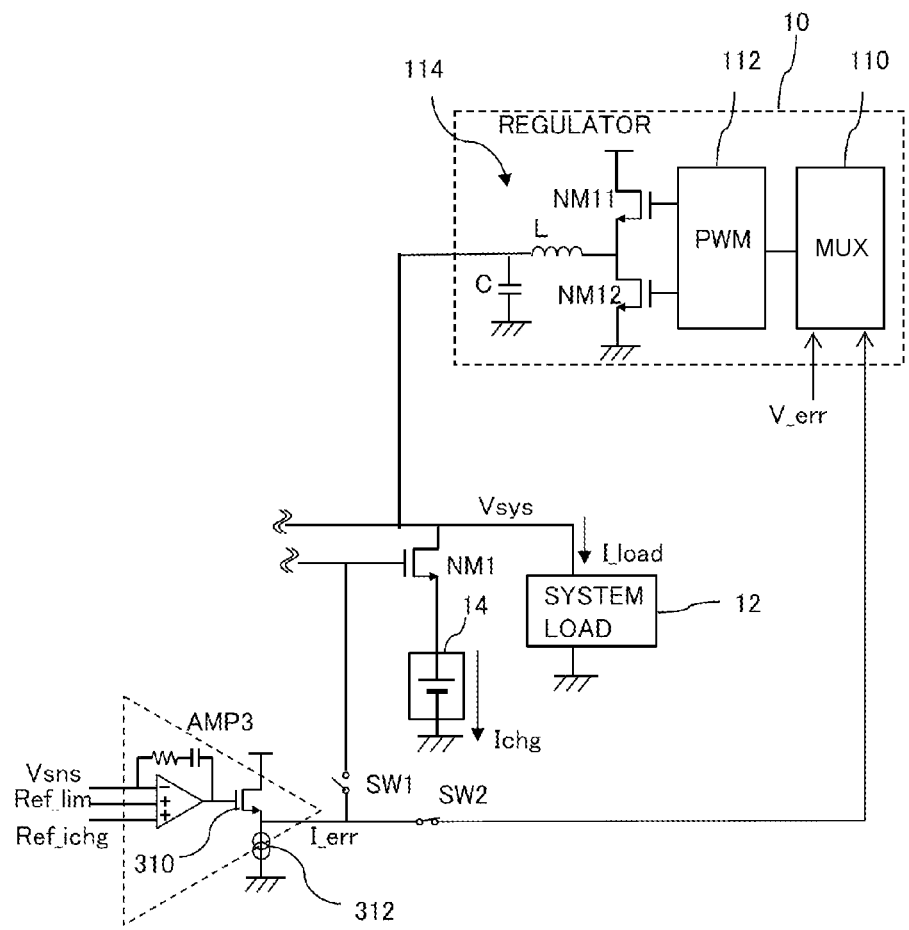
FIG. 5 is a diagram showing a configuration of a regulator 10 and a control signal of the regulator 10.

FIG. 5 is a diagram showing a configuration of the regulator 10 and a control signal thereof. According to this way, the regulator 10 includes a multiplexer (MUX) 110, a PWM circuit 112, and a switching circuit 114. The switching circuit 114 includes: a power source; serial connection structure of two transistors NM11 and NM12, disposed between the ground; a coil L, in which one end is connected to a midpoint of the transistors NM11 and NM12 and the other end is the output end of the system voltage Vsys; and a capacitor C, having the output end connected to the ground.

The PWM circuit 112 can control storage of the energy to the coil L or release therefrom by controlling the switching of the transistors NM11 and NM12, so as to control the charging voltage of the capacitor C, thereby controlling the system voltage Vsys, which is the output, to a predetermined value. For example, the switching circuit 114 is controlled based on either an error amplification signal V_err for the system voltage Vsys or an error amplification signal I_err for the charging current, which is input to the multiplexer 110, and therefore the output system voltage Vsys or the output current is controlled.

Here, when the voltage Vbat of the battery 14 has become a predetermined low voltage, the charging of the battery 14 is started. At this time, as shown in the left half of FIG. 4, the regulator 10 controls the system voltage Vsys to be constant (Vsys=Vsysmin+Vofs). In addition, as described above, the charging current Ichg is maintained constant by gate voltage control of the transistor NM1 based on the comparison of the signal Vsns and the signal Ref_ichg. The charging by using the gate voltage control of the transistor NM1 is referred to as a linear charging. The linear charging is constant current charging, and the battery voltage Vbat increases at a constant slope.

Then, when the battery voltage Vbat exceeds Vsysmin, a difference between the system voltage Vsys and the battery voltage Vbat becomes equal to or less than the offset voltage Vofs, and thus the linear charging is shifted to the switching charging.

During the switching charging, in a state that the transistor NM1 has been fully turned on, the PWM circuit 112 controls the charging current Ichg to a value corresponding to the signal Ref_ichg by controlling the switching of the transistors NM11 and NM12.

That is, during the linear charging, as shown in FIG. 5, a switch SW1 is turned on and a switch SW2 is turned off to control the gate voltage of NM1, but in a case of full-on, the switch SW1 is turned off and the switch SW2 is turned on to supply the signal I_err to the MUX circuit 110. Here, the signal I_err is a signal of a comparison result of the signal Vsns corresponding to the charging current Ichg and the signal Ref_ichg for the reference value of the charging current Ichg, and by controlling the switching of the transistors NM11 and NM12 based on the signal I_err, the charging current Ichg can be controlled to a value corresponding to the signal Ref_ichg, that is, the same value as when the linear charging is performed.

By means of the switching charging, the battery voltage Vbat increases in the same manner as when the linear charging is performed as shown in the right half of FIG. 4.

Then, the charging is completed when the battery 14 has been fully charged. Therefore, when the battery voltage Vbat has become a voltage close to a target voltage (a full charge voltage), the switching of the switching circuit 114 is controlled according to the battery voltage Vbat, and when the battery voltage Vbat has become the target voltage, the transistor NM1 is turned off by the gate control circuit 16 (see FIG. 1) to end the charging of the battery 14.

DESCRIPTION OF THE REFERENCE NUMERALS 10 regulator
12 system load
14 battery
16 gate control circuit
16a charge pump
18 reference voltage circuit
110 MUX circuit
112 PWM circuit
114 switching circuit
310 output transistor
312 constant current source

What is claimed is:
1. A power supply system, comprising:
a regulator, outputting a system voltage;
a load, receiving the system voltage to operate;
a battery, charged by the system voltage;
a charging transistor, receiving the system voltage and controlling a charging current to the battery;
a reference voltage circuit, outputting a reference charging current signal and a minimum system voltage signal; and
a three-input amplifier, in which three factors including a charging current detection value, the reference charging current signal, and a reference limit current signal determined according to a difference between a system voltage signal and the minimum system voltage signal are input, and which obtains an output corresponding to a difference between the reference charging current signal and the charging current detection value when the reference charging current signal is equal to or less than the reference limit current signal, and obtains an output corresponding to a difference between the reference limit current signal and the charging current detection value when the reference charging current signal exceeds the reference limit current signal, wherein
a current of the charging transistor is controlled by the output of the three-input amplifier.

2. The power supply system according to claim 1, wherein the output of the three-input amplifier is supplied to the regulator, and an operation of the regulator is controlled by the output of the three-input amplifier.

\* \* \* \* \*